3,147,693
BUNCH TYING APPARATUS FOR ROD MATERIAL
Rudolf Renk, Oberhausen, Rhineland, Germany, assignor to Maschinenfabrik Sack G.m.b.H., Dusseldorf-Rath, Germany, a corporation of Germany
Filed Oct. 8, 1962, Ser. No. 228,944
Claims priority, application Germany Sept. 11, 1962
3 Claims. (Cl. 100—7)

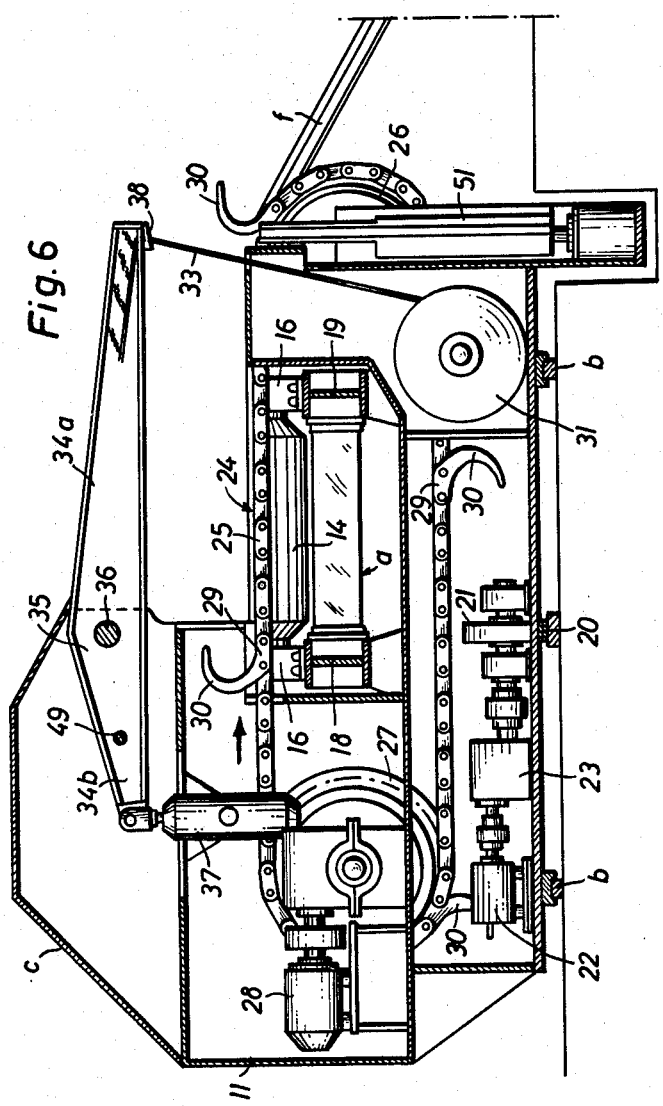

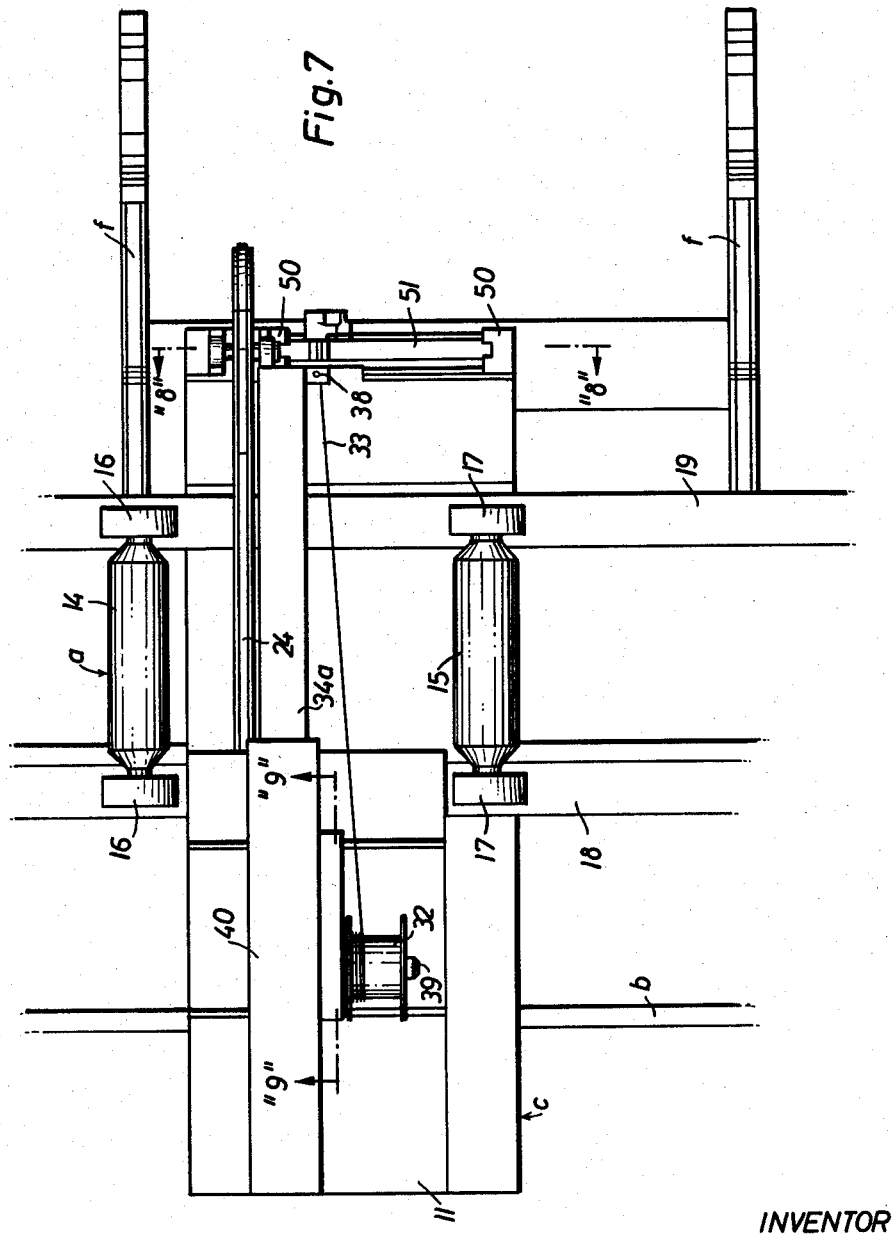

My invention relates to bunch tying apparatus for rod material in which a number of rods to be bunched together are supplied on a conveyor, then seized by an entrainer and thereafter surrounded by a sling of wire which is tightened about the material by a twisting device, whereafter the tying loop thus formed is cut off to permit removing the bundle of rod material.

It is an object of my invention to improve the efficiency and the output per time unit of such bunch tying equipment. More specifically, it is an object of the invention to provide a bunch tying apparatus for rod material which affords supplying further rod material on the feeder conveyor while the bunching and the twisting of wire loops are still taking place on material previously supplied, thus greatly reducing the amount of time required for continuous operation.

Another object of my invention is to devise an apparatus of the mentioned type in which the residual wire, remaining after the twisting and cutting operations, is not discarded in form of individual pieces but constitutes a coherent structure that can be wound upon a drum.

The foregoing and other objects and advantages of my invention, as well as the novel features by virtue of which they are achieved, will be apparent from, and will be described in, the following with reference to an embodiment of bunch-tying machinery according to the invention illustrated by way of example on the accompanying drawings in which:

FIG. 6 is a cross section along the line 6—6 in FIG. 5.

FIG. 7 is a top view of the machine according to FIG. 2.

Figure 1:
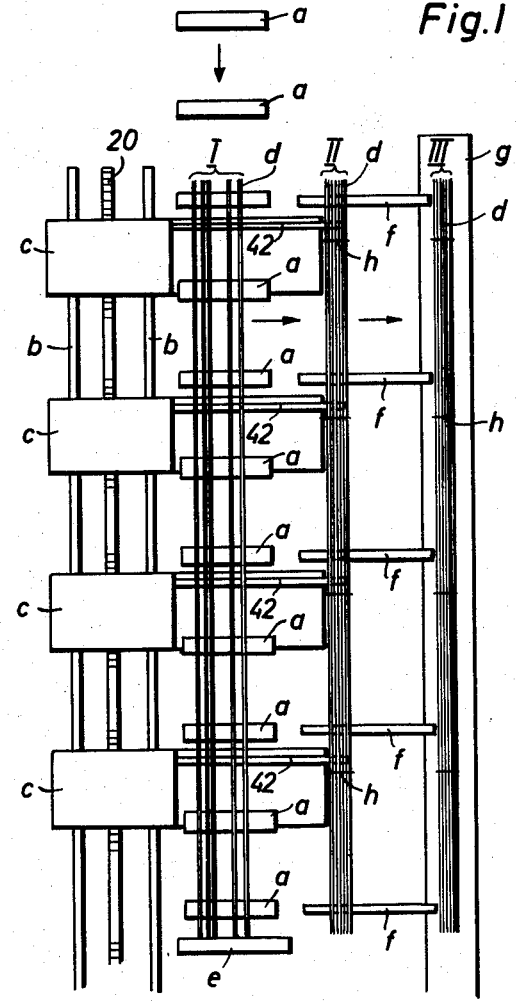
FIG. 1 is a diagrammatic and explanatory plan view of a plant for tying rod material into bunches, comprising a multiplicity of machine units designed and operating in accordance with the invention.
Figure 2:
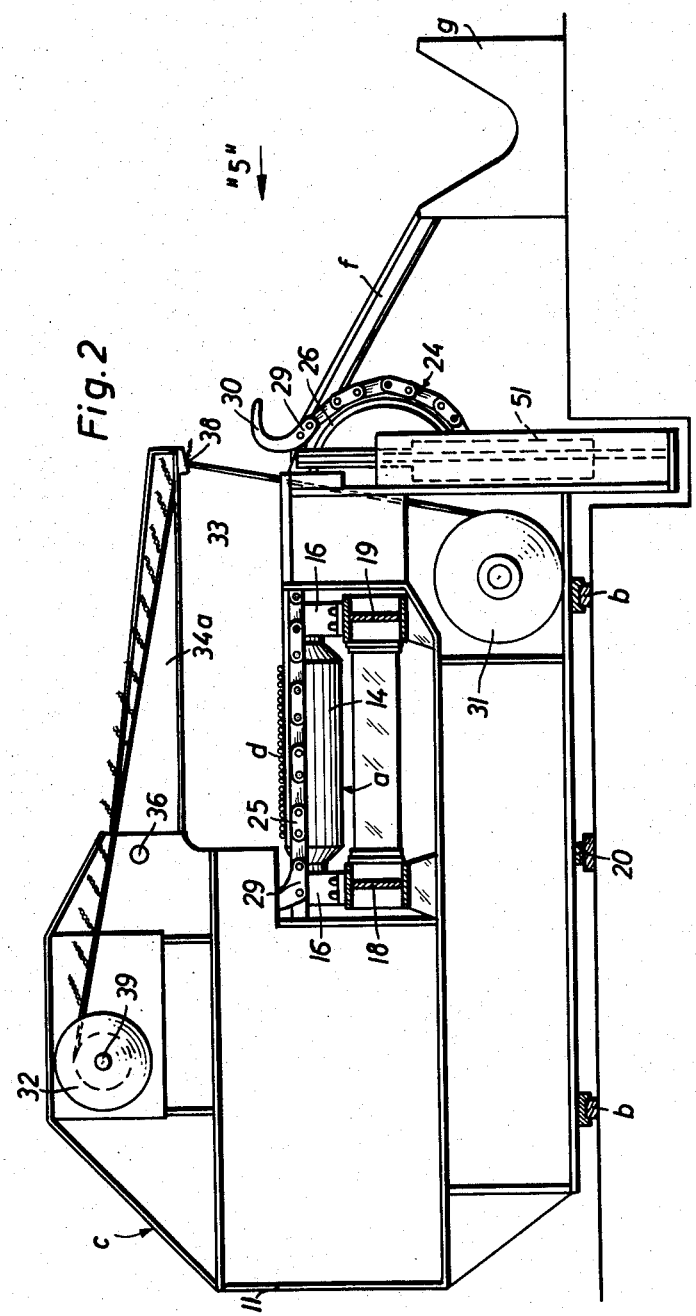
FIG. 2 is a front view of a single bunch tying apparatus or unit in a working stage prior to forming a bunch of rod material.

The diagram in FIG. 1 illustrates in which manner a system of several units according to the invention can be arranged in order to tie rods into bunches, the number of individual tying units, all cooperating with a single feeder conveyor, being chosen or operated in dependence upon the length of the rod material to be bundled or the number of individual tie loops to be formed. The plant comprises a roller conveyor of conventional design comprising a number of rollers "a" which are revolvable about parallel axes, to jointly define a straight and elongated feeder path for the supply of rod material in the direction indicated by a vertical arrow. The roller conveyor extends considerably beyond the range represented in the drawings. Mounted beside the roller conveyor and parallel to the conveyor path are rails $b$ upon which several tying machine units are displaceable. Each of the units $c$ serves the purpose of providing the rod material, arriving on the conveyor $a$, with a surrounding sling of wire. FIG. 1 shows four such units $c$. Generally, however, a greater number of tying units is preferable in order to afford producing very long bundles. Such a plant then permits the bunching of long rods as well as short rods, and to place the individual tie-wire loops at smaller or larger distances from one another, simply by operating only a few or all of the machine units $c$.

Details of design and operation of the tying units $c$ will be described in a later place. In FIG. 1, however, a few rods $d$ are schematically indicated as having been supplied to the operating range of the tying units $c$ by means of the roller conveyor $a$ so that they just occupy the position I beside the tying units $c$. A stop wall $e$ may be located at the end of the roller conveyor in order to take care that the forward ends of the rods are all located in a single plane. However, such a stop wall can be omitted if the individual rods are placed from the outset in the desired order upon the roller conveyor and the roller conveyor is stopped when the rods arrive in the proper position beside the bunch-tying units.

In the manner still to be described, the rods are then displaced by the machine units $c$, prior to being surrounded by tie wire, from the position I and away from the rollers of the conveyor to the position II where the bunching and tying takes place. Some of the tie slings or loops are denoted by $h$. During the looping and tying operation, the roller conveyor is already vacant. Hence new material can now be supplied while the preceding number of rods are still being bunched and tied together. When the tying operation is terminated, the tie wires are cut off, and the bunch thus formed glides on inclined rails $f$ into a trough $g$ in which the bunch occupies the position III. From the trough the bunch can be removed, for example by means of a crane. However, the trough $g$ may also be substituted by another roller conveyor or any other transporting equipment.

The essential components of a tying machine, as represented in FIG. 1 by any of the units $c$, are supported according to FIGS. 2 to 9 by a main frame structure 11 consisting of welded sheet steel. The frame structure 11 rests upon the above-mentioned rails $b$ installed on the plant floor in parallel relation to the roller conveyor $a$. Only two of the rollers $a$ are apparent in FIG. 7 where they are denoted by 14 and 15. The bearings 16 and 17 of these rollers are mounted on longitudinal beams 18 and 19 which extend through the frame structure 11 of each machine. The roller 15 is omitted in FIGS. 2, 3 and 4 to prevent obscuring other machine components.

To readily permit displacing the indivdual machines along the rails $b$, a drive is provided in form of a rack 20 which is mounted on the floor and meshes with a spur gear 21 on each machine. The spur gear 21 (FIG. 6) can be rotated in one or the other direction by means of an electric motor 22 through a transmission 23.

Each machine comprises an endless chain 24 composed of individual links 25 that are articulately joined with each other. The chain runs on sprocket wheels 26 and 27 (FIG. 6). The sprocket 27 is coupled through a transmission with a motor 28 which serves for driving the chain 24. Individual links of the chain 24, in the illustrated embodiment the four links denoted by 29, are designed as entrainers. For this purpose, the links 29 have arcuate fingers 30 which protrude outwardly from the chain 24 (FIGS. 2 to 6).

Each machine comprises a reel 31 for accommodating a coil of tie wire, and another reel 32 for receiving the wire waste in the manner described further below. The wire 33 passes from the supply reel 31 in an approximately vertically upward direction to the free end of an arm 34a which forms part of a lever 35 rotatable about a pivot pin 36. The lever 35 can be moved back and forth within given limits by means of a pneumatic or hydraulic cylinder-piston drive 37 (FIG. 6), or other suitable actuator of known standard type. At the free end of the arm 34 the wire 33 passes through a hole 38 where the wire changes its direction and passes to the takeup reel 32.

Figure 9:
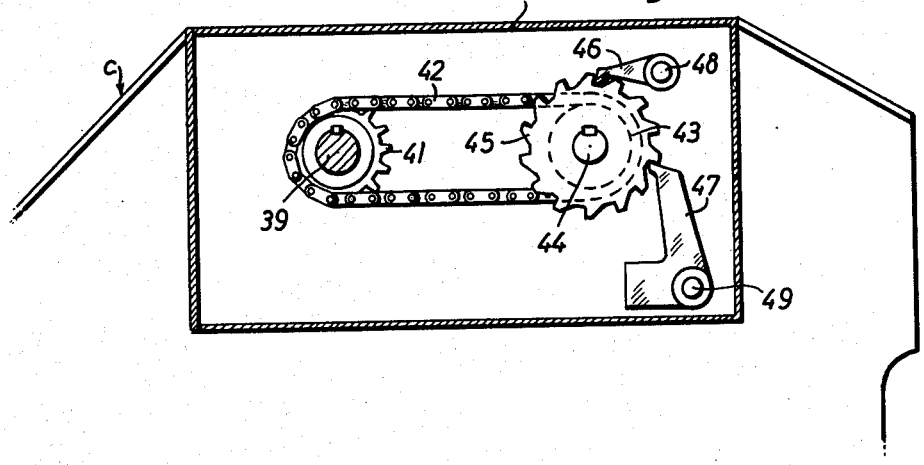
FIG. 9 is a section along the line 9—9 in FIG. 7 but on larger scale.

The reel 32 is fastened on a shaft 39 whose bearings and drive means are enclosed in a box structure 40 shown in FIG. 9. Fastened on the shaft 39 is a sprocket wheel 41 driven through a chain 42 from a sprocket 43. Fastened on the shaft 44 of the driving sprocket 43 is a ratchet gear 45 engaged by two pawls 46 and 47. Due to their own weight, both pawls have the tendency to remain in engagement with the teeth of the ratchet 45. Pawl 46 is rotatable on a fixed pin 48 and acts only as a detent for preventing clockwise rotation (FIG. 9) of the ratchet 45. Pawl 47 is mounted on a pin 49 which extends through the wall of the box 40 to the outside and is fastened on the left arm 34b (FIG. 6) of lever 35. The motion which the pawl 47 performs during each clockwise motion of lever 35 (FIG. 6) causes ratchet 45 to turn one tooth division counterclockwise, whereas counterclockwise rotation of lever 35 (FIG. 6) cannot impart rotation to the ratchet 45 because of the retaining action of the detent pawl 46 and thus only serves for resetting the driving pawl 47 (FIG. 9).

A slider 51 (FIGS. 1 to 7) is mounted at the right of the vertical wire portion 33 and is displaceable in guide members 50 (FIGS. 5, 7, 8) of the frame structure 11. The slider 51 has the shape of a box structure. An actuator, here consisting of a pneumatic cylinder-piston drive 52 (FIGS. 5, 8), permits shifting the slider 51 from the base position shown in FIGS. 5 and 8 a given distance in the upward direction. The slider 51 constitutes the carrier of a wire twisting device and of a wire cutter.

The twisting device comprises a circular disc 53 (FIGS. 5, 8) which is provided with a radial slot 54 and is rotatably mounted on the slider 51. When the disc 53 is in normal position, the slot 54 extends vertically and registers with an opening 55 in the wall of the slider 51. The slot 54 extends from the periphery of the disc 53 inwardly to some extent beyond the center point of the disc 53. The width of the slit 54 is slightly larger than the diameter of the tie wire but smaller than twice the diameter of the tie wire. Such twisting discs are generally known as such and for that reason need not be further described herein.

The periphery of the twisting disc 53 is provided with gear teeth meshing with a spur gear 57 on a shaft 58 which carries another spur gear 59. Gear 59 meshes with a spur gear 60 driven from an electric motor 61 whose shaft 62 is rigidly joined with gear 60.

The above-mentioned cutter device comprises an arm 63 (FIG. 5) with a cutting edge 64. The arm 63 is fastened on a shaft 65 and is driven by means of another arm 66 connected with the shaft 65 and linked to an actuator, also shown as a pneumatic cylinder-piston drive 67. The arm 63 is in the immediate vicinity of the twisting disc 53. The cutting edge 64 passes close to the disc 53 when the drive 67 is being actuated.

The operation of the machine will now be described with reference to the control diagram in FIG. 10 wherein the abscissas denote time and indicated respective time points $t_0$–$t_6$, and curves denote by their amplitudes the on-off or up-down operation of the conveyor "a," and the respective drives and actuators 28, 52, 61 and 67.

Before commencing the operation the tie wire 33 is tautened. This is done by pulling the free wire end from the coil on reel 31, threading the wire through the hole 38 in arm 34, and fastening the wire end to reel 32. The bundling work can now be started. At first the machine components are all in the positions illustrated in FIG. 2 and all electric and other drives are at rest. A number of rods to be tied together are supplied on the roller conveyor ($t_0$–$t_1$ on curve in FIG. 10) until they are located in the range of the entrainer chains 24 of the machine units. Then the roller conveyor is stopped ($t_1$).

Figure 3:
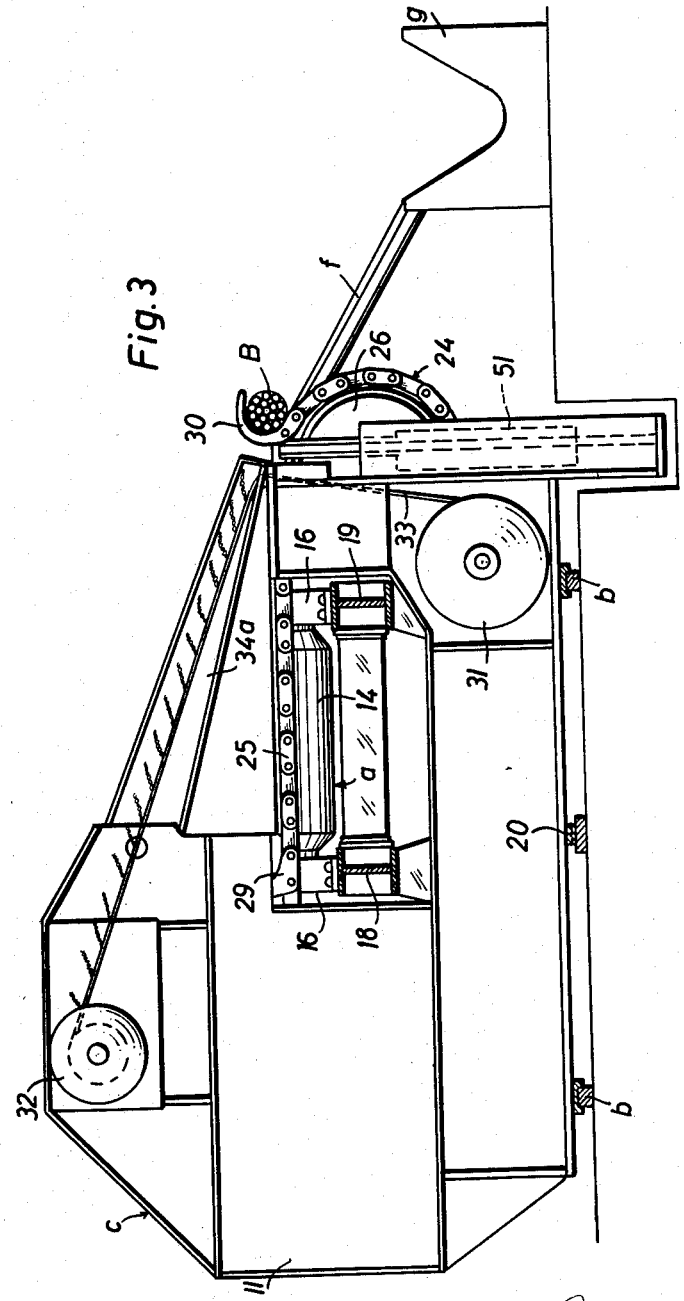
FIG. 3 is a front view similar to that of FIG. 2 but relating to an operating stage occurring during formation of a bunch.

Thereafter the entrainer chain 24 in each tying unit is advanced by the drive motor 28 ($t_2$–$t_4$ in FIG. 10) one-quarter of the chain length in the direction of the arrow indicated in FIG. 6. One of the entrainer fingers 30 then hits against the rod material d and the pushes it laterally off the rollers of the conveyor against the taut portion of the wire 33. Simultaneously the lever 35 is turned by the actuator 37 ($t_3$ in FIG. 10) in the lowering direction of the arm 34a. Now the individual rods of the material d are bunched together in the curved entrainer fingers 30 of the respective machine units under the counter-action of the tensioned wires 33 so that a bunch B is formed. When in this manner the condition shown in FIG. 3 is reached, the chain 24 is stopped ($t_4$ in FIG. 10). From this moment ($t_4$) on, the roller conveyor can again be put in operation in order to supply further rod material d in the next following interval of time in which the bunch B is tied and completed.

Figure 4:
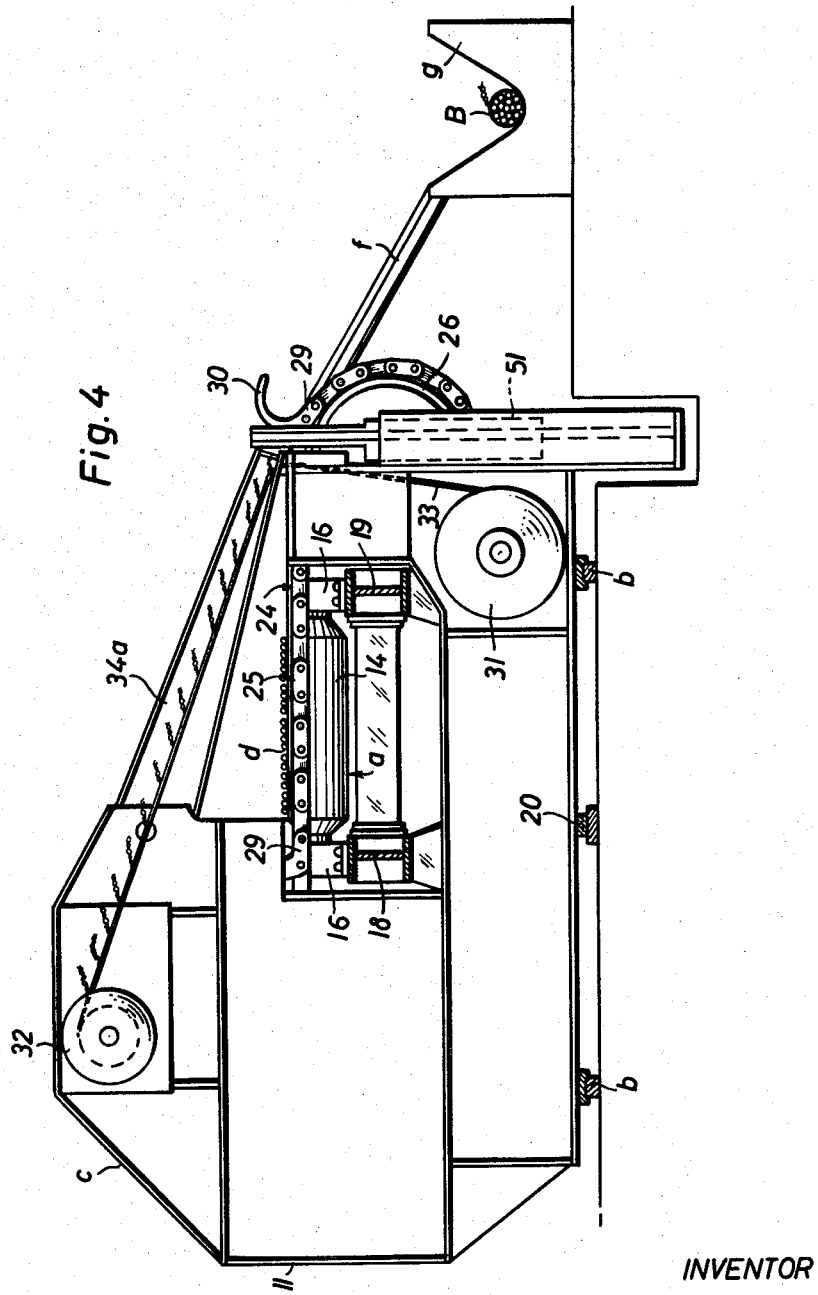
FIG. 4 is another front view similar to FIG. 2 but relating to an operating stage subsequent to completion of a bunch.
Figure 5:
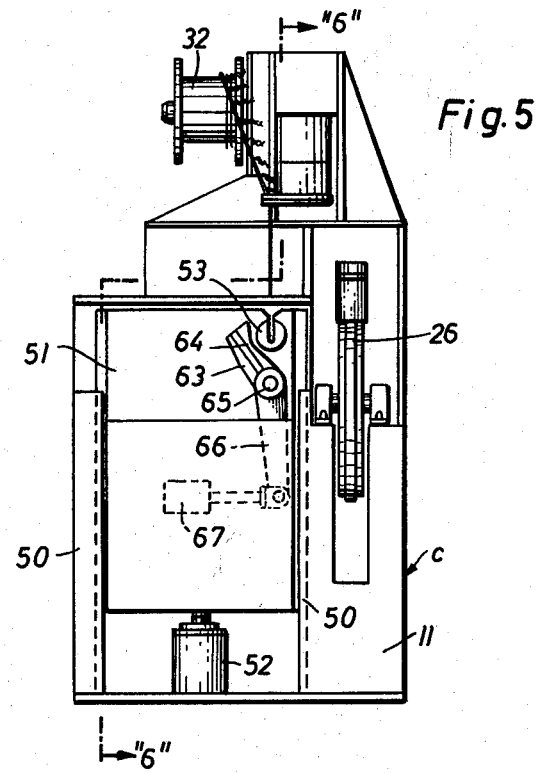
FIG. 5 is a lateral view of the machine unit according to FIG. 2 seen in the direction of the arrow "5" in FIG. 2.
Figure 8:
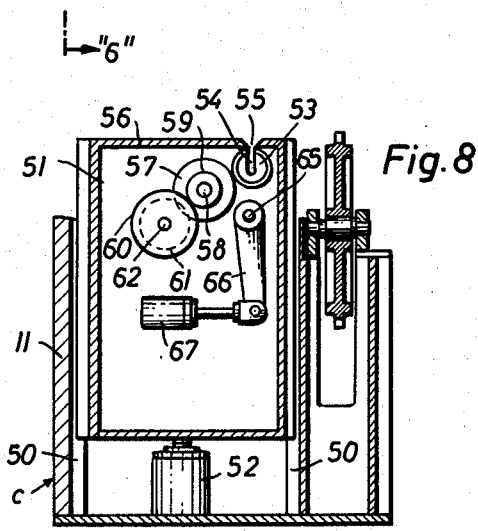
FIG. 8 is a cross section along the line 8—8 in FIG. 7.

For completion of the bunch B, the slider 51 is lifted by the actuator 52. This causes the two ends of the wire loop, formed when the stage of FIG. 3 is reached, to enter into the slit 54 in the twisting disc 53. The position then occupied by the slider 51 is shown in FIG. 4. Then the motor 61 is switched on ($t_5$ in FIG. 10) in order to impart a given number of full rotations to the twisting disc 53, namely as many rotations as are individual twisting turns to be imparted to the wire. When this operation is terminated ($t_6$), the actuator 67 operates the cutter arm 63 and the cutting edge 64 severs the twisted portion of the tie wire. This releases the tied bunch B so that it glides down on rails f into the receiving trough g.

When the twisted portion of the wire is being cut, the coherence of the wire on the coil of reel 31 with the wire fastened to the takeup reel 32 remains preserved. This coherence is due to the amount of twisting that in FIGS. 2, 3 and 4 remains located at the left of the slider 51, whereas the twisted portion of wire located at the right of the slider leaves the machine together with the completed bunch and its tied wire loops. During each cycle of operation, the reel 32 is turned forward a given angle by the motion of the lever 35 under the action of the pawl 47, the ratchet 45 and the chain drive 41, 42, 43, thus winding the wire waste upon the takeup reel 32. The amount of wire thus wound upon the reel 32 after a repetition of bunch-tying operations consists of a relatively long starting piece and a subsequent number of individual wire pieces whose ends are connected with each other by twisting, the lengths of the twisted pieces being shown exaggerated for the purpose of lucid illustration. As a result, the wire waste forms a single coil which can readily be removed, transported and smelted. Individual wire pieces which must be collected and filled into containers are thus avoided.

All of the machines of a single plant as schematically represented in FIG. 1, operate in the same manner and at the same time. It suffices for this purpose that the individual drives which perform analogous or mutually coordinated operations in the respective units c be switched on and off simultaneously. However, accurate synchronism may also be secured by suitable couplings between the drives of the respective machine units. Such couplings may have any mechanical, electrical, hydraulic, pneumatic or electronic operation as available in various types of coupling systems known for such purposes. It will also be understood that a bunch tying plant with a multiplicity of machines according to FIGS. 2 to 9 may be so operated that when rod material of shorter length is to be bunched only the necessary number rather than all available tying machines, need be switched into operation.

Figure 10:
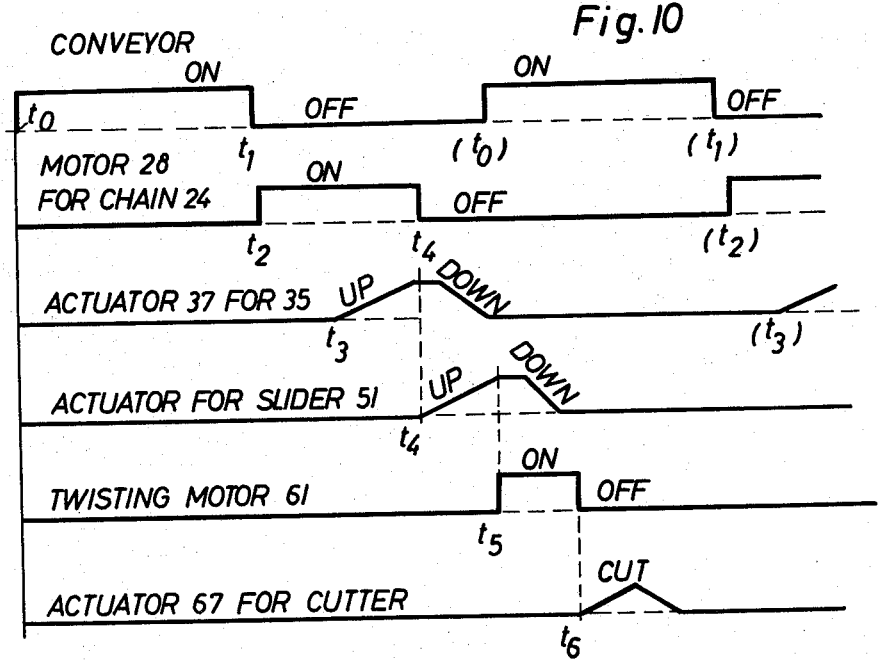
FIG. 10 is a time control diagram of operations relating to the machines according to FIGS. 1 to 9.

It will be further be understood that, while the switching operations according to FIG. 10 can be performed by hand, for example with the aid of an electric contact switch such as a drum type controller, the switching can be readily effected by automatic control, a diagram of the kind shown in FIG. 10 being available for conventional preparation of a switch or controller layout. Any such electrical, mechanical or other control means, however, are not part of the invention proper and may assume different types and forms, as well known for such purposes and not relevant to the essential machine features proper. As to the latter, it will be obvious to those skilled in the art, upon a study of this disclosure, that with respect to construction and arrangement, my invention permits of a variety of modifications and hence can be given embodiments other than particularly illustrated and described herein, without departing from the essential features of my invention and within the scope of the claims annexed hereto.

I claim:

1. Bunch tying apparatus for rod material, comprising a roller conveyor forming an elongated feeder path for supplying the rod material in the longitudinal direction of the material, an elongated support structure laterally adjacent and parallel to said path, an endless chain having a portion extending transversely of said conveyor path and support structure, said chain being movable in the direction from said conveyor to said support structure and having a hook-shaped entrainer finger engageable with the material so as to entrain and bunch the material while displacing it transversely off said conveyor and onto said support structure, a tie-wire supply reel, wire guide means forming a wire path from said supply reel, said wire path extending across the direction of entrainer displacement so as to cause the wire to curve around the material entrained against the wire, a twisting device engageable with the wire for fastening a wire loop around the bunch of material, and a cutter located beside said feeder path for cutting the twisted wire to thereby release the completed bunch.

2. A bunch tying apparatus for rod material according to claim 1, comprising a carrier normally in inactive position and displaceable to active position, said twisting device and said cutter being mounted on said carrier and individually controllable to engage the wire only when said carrier is in said active position, said twisting device and said cutter when engageable with the wire being located between said support structure and said entrainer finger, whereby the cutter acts upon the previously twisted wire portion and the wire waste remains twisted together to form a substantially coherent strand.

3. In a bunch tying apparatus for rod material according to claim 1, wire guide means comprising a takeup reel, a wire tensioning arm having wire passage means through which the wire passes from said supply reel past said support structure to said takeup reel, said wire path being formed by the wire portion between said passage means on said arm and said supply reel, and said arm being movable toward said support structure during bunching operation to permit said finger to sling said wire on said wire path about the bunch being formed.

References Cited in the file of this patent

UNITED STATES PATENTS

| 1,571,573 | Cranston | Feb. 2, 1926 |

FOREIGN PATENTS

| 421,721 | Germany | Nov. 17, 1925 |
| 447,716 | Germany | July 28, 1927 |
| 682,133 | Germany | Oct. 9, 1939 |
| 845,461 | France | May 15, 1939 |

OTHER REFERENCES

Germany; Sch 11,859, Apr. 5, 1956.